(12) United States Patent
Kim et al.

(10) Patent No.: US 10,513,172 B2
(45) Date of Patent: Dec. 24, 2019

(54) FRONT END MODULE FOR ELECTRIC VEHICLE

(71) Applicants: Hyundai Motor Company, Seoul (KR); Kia Motors Corporation, Seoul (KR); Hanon Systems, Daejeon (KR)

(72) Inventors: Byoung Chul Kim, Seoul (KR); Ok Ryul Min, Daejeon (KR); Sung Wook Park, Daejeon (KR)

(73) Assignees: Hyundai Motor Company, Seoul (KR); Kia Motors Corporation, Seoul (KR); Hanon Systems, Daejeon (KR)

( * ) Notice: Subject to any disclaimer, the term of this patent is extended or adjusted under 35 U.S.C. 154(b) by 0 days.

(21) Appl. No.: 16/129,111

(22) Filed: Sep. 12, 2018

(65) Prior Publication Data

US 2019/0315222 A1 Oct. 17, 2019

(30) Foreign Application Priority Data

Apr. 16, 2018 (KR) ........................ 10-2018-0043927

(51) Int. Cl.
  *B60K 11/08* (2006.01)
  *B60K 1/00* (2006.01)
  *B60K 11/04* (2006.01)

(52) U.S. Cl.
  CPC .............. *B60K 11/085* (2013.01); *B60K 1/00* (2013.01); *B60K 11/04* (2013.01); *B60K 2001/006* (2013.01)

(58) Field of Classification Search
  CPC ............................. B60K 11/085; B60K 11/04
  See application file for complete search history.

(56) References Cited

U.S. PATENT DOCUMENTS

| | | | | |
|---|---|---|---|---|
| 8,746,386 | B2* | 6/2014 | Atkinson | B60R 19/48 123/41.7 |
| 9,061,585 | B2* | 6/2015 | Fujiu | B60K 11/08 |
| 9,969,342 | B2* | 5/2018 | Klop | B60R 13/06 |
| 2001/0045761 | A1 | 11/2001 | Ozawa et al. | |
| 2009/0261601 | A1* | 10/2009 | Shin | B62D 25/084 293/115 |
| 2009/0266312 | A1* | 10/2009 | Preiss | B60K 11/04 123/41.05 |
| 2014/0090911 | A1* | 4/2014 | Oota | B60K 11/085 180/68.1 |

(Continued)

FOREIGN PATENT DOCUMENTS

EP 1153821 B1 1/2007
JP H10329756 A 12/1998

(Continued)

*Primary Examiner* — Brian L Swenson
(74) *Attorney, Agent, or Firm* — Mintz Levin Cohn Ferris Glovsky and Popeo, P.C.; Peter F. Corless

(57) ABSTRACT

A front end module for an electric vehicle is provided. The front end module includes a carrier that is disposed inside a bumper cover having a lower grille. The carrier includes a receiving opening within which a heat exchanger is disposed. In addition, an active air flap is disposed below the carrier and adjacent to the lower grille, the active air flap having a plurality of pivotable flaps. Further, the front end module includes an air guard that is disposed above the active air flap and covers a front surface of the heat exchanger disposed within the receiving opening of the carrier.

11 Claims, 11 Drawing Sheets

(56) References Cited

U.S. PATENT DOCUMENTS

| | | | | |
|---|---|---|---|---|
| 2014/0290599 A1* | 10/2014 | Numata | ............... | F01P 7/10 |
| | | | | 123/41.05 |
| 2015/0041229 A1* | 2/2015 | Maurer | ............. | B60K 11/06 |
| | | | | 180/68.1 |
| 2018/0015819 A1* | 1/2018 | Froling | ............. | B60K 11/04 |
| 2018/0022210 A1* | 1/2018 | Matsumura | ......... | B60K 11/04 |
| | | | | 123/41.05 |

FOREIGN PATENT DOCUMENTS

| | | |
|---|---|---|
| JP | 2001-199364 A | 7/2001 |
| JP | 2007-091061 A | 4/2007 |
| KR | 2009-0079061 A | 7/2009 |

* cited by examiner

FRONT END MODULE FOR ELECTRIC VEHICLE

CROSS-REFERENCE TO RELATED APPLICATION

This application claims priority to Korean Patent Application No. 10-2018-0043927, filed on Apr. 16, 2018, the disclosure of which is incorporated herein in its entirety by reference.

TECHNICAL FIELD

The present disclosure relates to a front end module for an electric vehicle, and more particularly, to a front end module for an electric vehicle that reduces overall weight and cost.

RELATED ART

As is well-known in the art, a front end module for a vehicle forms a front part of a body framework. The front end module for a vehicle includes a carrier which supports a heat exchanger (a radiator, a condenser, and the like), headlamps, a bumper, and the like. The carrier has an upper member, a lower member, and a side member.

A vehicle equipped with an internal combustion engine requires relatively high cooling performance with respect to the front part of the body, and accordingly, a bumper cover of the vehicle equipped with the internal combustion engine has an upper grille in an upper region thereof and a lower grille in a lower region thereof. As the front end module of the vehicle equipped with the internal combustion engine is configured to have a structure suitable for the upper grille and the lower grille, the carrier requires a complex structure and high stiffness.

Meanwhile, the lower member of the carrier interferes with other components disposed on the front part of the body, which leads to various limitations in designing the front part of the body. Eliminating the lower member of the carrier prevents issues such as interference with other components and results in reduction of weight and cost. Thus, research and development for eliminating the lower member of the carrier have been conducted.

However, since an electric vehicle is not equipped with an internal combustion engine in a front part of a body thereof, the required cooling performance with respect to the front part of the body is relatively low, and thus, an upper region of a bumper cover of the electric vehicle is closed and a lower region thereof includes a lower grille. The lower grille has an active air flap adjacent thereto to allow outside air to be guided to a heat exchanger by opening the active air flap.

Thus, the front end module for an electric vehicle needs to be designed to be suitable for the bumper cover of the electric vehicle.

SUMMARY

An aspect of the present disclosure provides a front end module for an electric vehicle, which is configured to be suitable for a bumper cover of the electric vehicle, thereby reducing manufacturing costs and weight of the front end module.

According to an aspect of the present disclosure, a front end module for an electric vehicle may include a carrier disposed inside a bumper cover having a lower grille, the carrier having a receiving opening; a heat exchanger disposed within the receiving opening; an active air flap disposed below the carrier and adjacent to the lower grille, the active air flap having a plurality of pivotable flaps; and an air guard disposed above the active air flap, and covering a front surface of the heat exchanger disposed within the receiving opening of the carrier. The carrier may include a cross portion and a pair of vertical portions that extend vertically from both ends of the cross portion, and the receiving opening may be defined by the cross portion and the pair of vertical portions.

The air guard may have a cavity that faces the front surface of the heat exchanger. The air guard may also have an open end that faces the active air flap, and outside air may be introduced into the cavity of the air guard by opening the plurality of flaps. The air guard may be connected to the carrier to form a unitary one-piece structure. A top edge of the air guard may be integrally connected with the cross portion through an upper connecting wall. Both lateral edges of the air guard may be integrally connected with the pair of vertical portions through a pair of lateral connecting walls.

Further, the lateral connecting walls may have seal ribs that extend vertically, and seals may be interposed between the seal ribs and both lateral edges of the heat exchanger. Each of the lateral connecting walls may have a plurality of apertures.

The cross portion may have a receiving groove within which a top edge of the heat exchanger may be disposed. The front end module may further include a pair of side panels coupled to the plurality of vertical portions, respectively, wherein the carrier may be made of plastic, and the side panels may be made of metal. The carrier may further include a pair of reinforcing members that extend from the vertical portions to a center of the cross portion, respectively, and the pair of reinforcing members may be symmetrical to each other with respect to the center of the cross portion. A hood latch retention may be disposed at the center of the cross portion, and a top end of each of the reinforcing members may be coupled to the hood latch retention.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
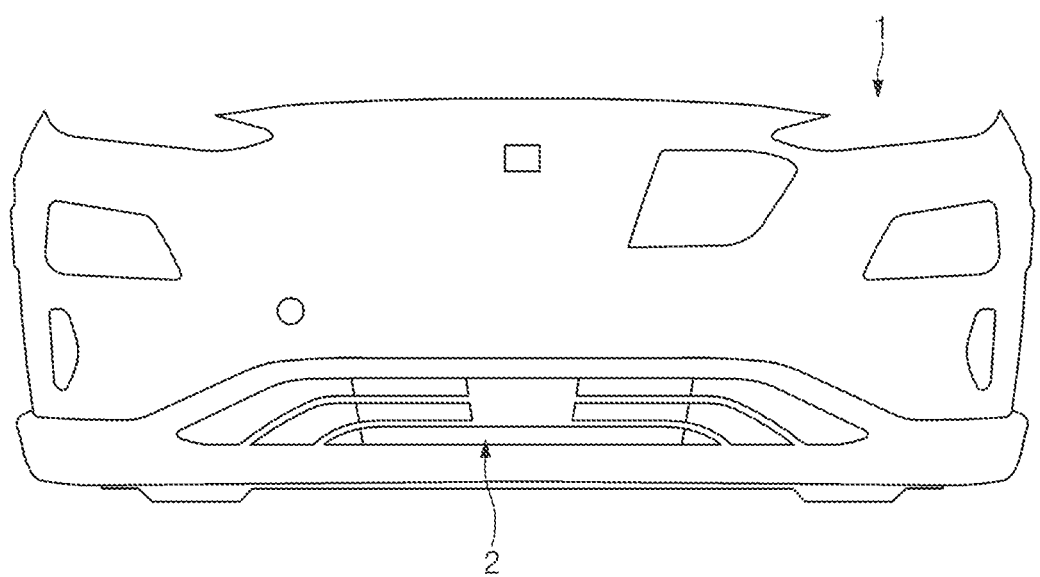
FIG. 1 illustrates an example of a bumper cover for an electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
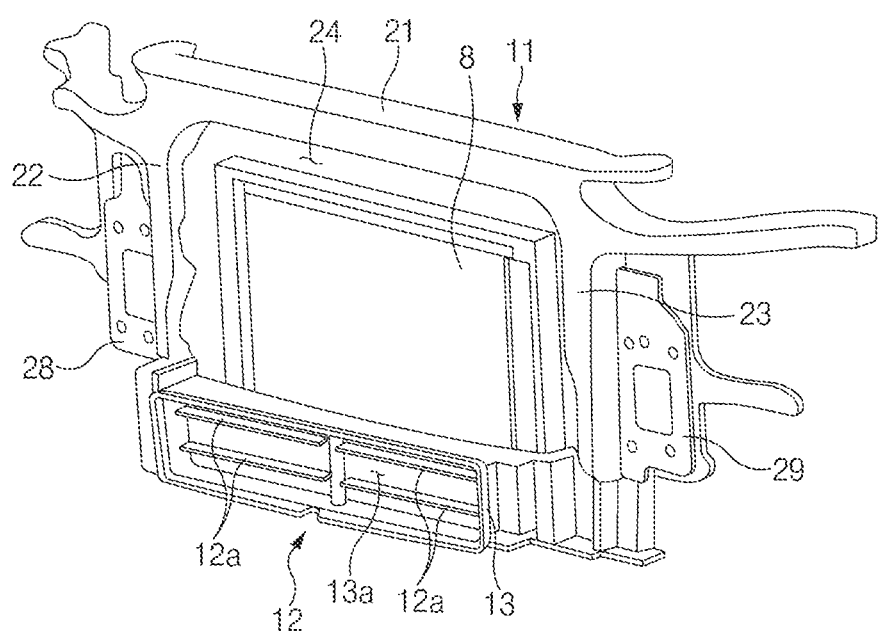
FIG. 2 illustrates a perspective view of a front end module for an electric vehicle, according to an exemplary embodiment of the present disclosure.
Figure 3:
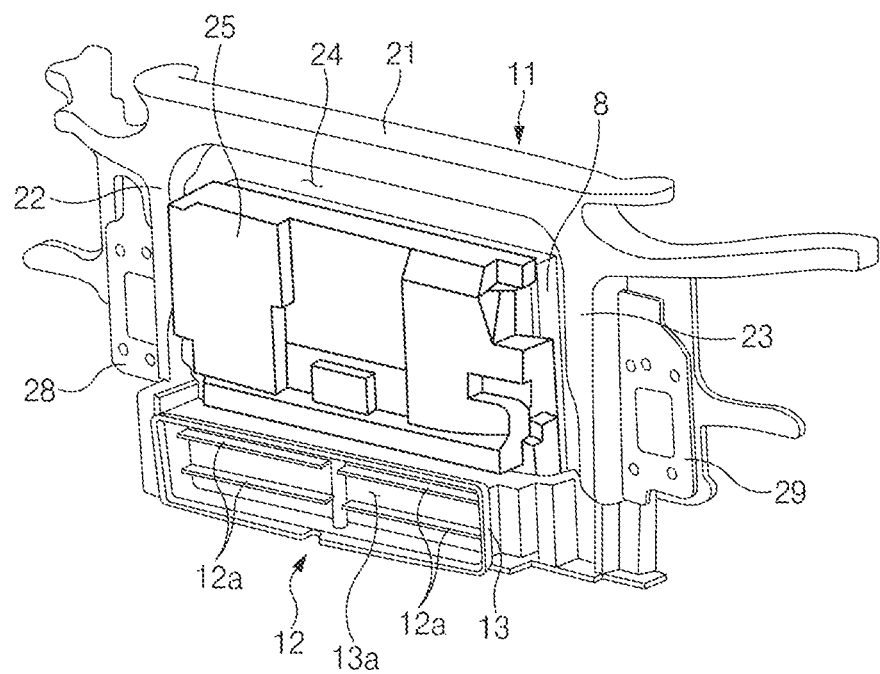
FIG. 3 illustrates a perspective view of a front end module for an electric vehicle, according to another exemplary embodiment of the present disclosure.
Figure 4:
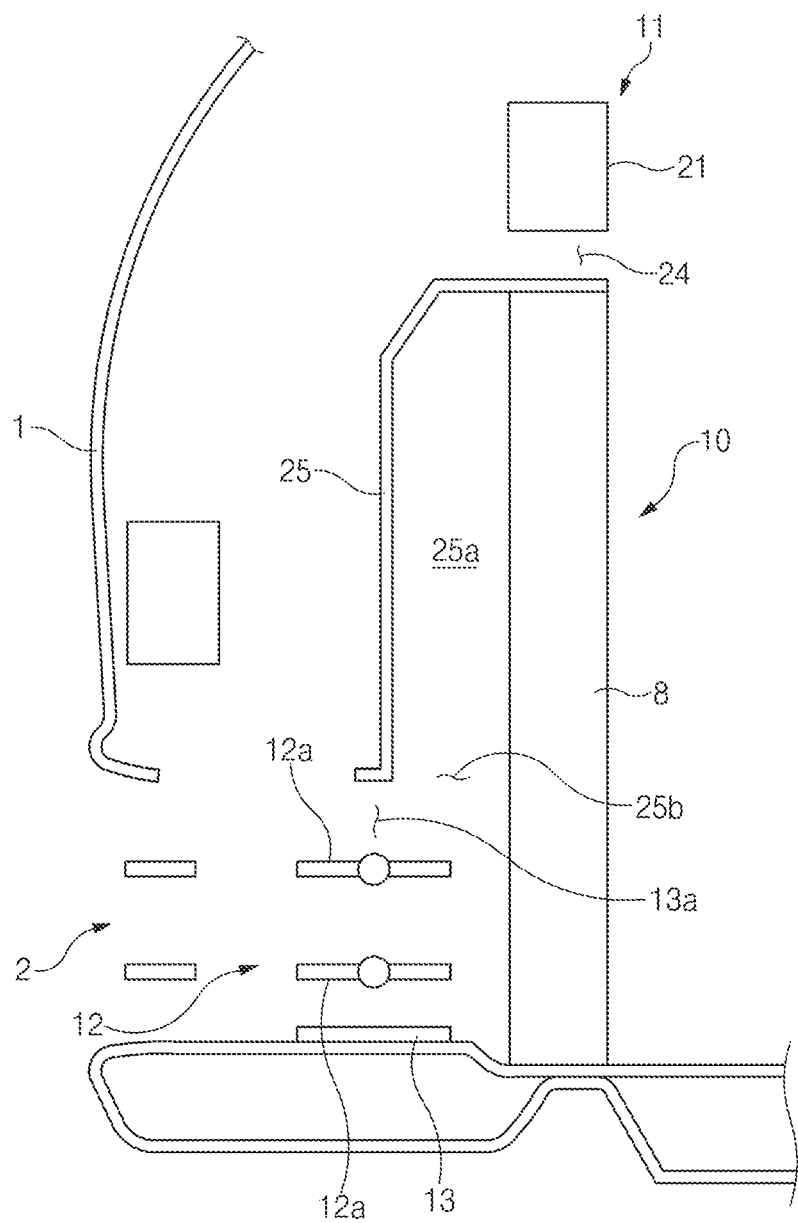
FIG. 4 illustrates a side cross-sectional view of the front end module illustrated in FIG. 3.

Referring to FIG. 1, an upper region of a bumper cover 1 for an electric vehicle may be closed. A lower region of the bumper cover 1 may include a lower grille 2 to allow outside air to be introduced into a front part of the electric vehicle through the lower grille 2. Referring to FIGS. 2 to 4, a front end module 10 for an electric vehicle, according to exemplary embodiments of the present disclosure, may include a carrier 11 and an active air flap 12 disposed below the carrier 11. The carrier 11 may be disposed inside the bumper cover 1.

The carrier 11 may include a cross portion 21 that extends in a width (e.g., lateral) direction of a vehicle body, and a pair of vertical portions 22 and 23 that extend from the cross portion 21 in a vertical direction. Side panels 28 and 29 onto which bumper beams and the like are mounted may be coupled to the vertical portions 22 and 23, respectively, and the side panels 28 and 29 may be made of metal such as SGAFC590. The side panels 28 and 29 may be integrally formed with the vertical portions 22 and 23 by insert injection molding, respectively.

Further, the carrier 11 may include a receiving opening 24 defined by the cross portion 21 and the pair of vertical portions 22 and 23, and the receiving opening 24 may receive a heat exchanger 8. According to an exemplary embodiment of the present disclosure, the cross portion 21 and the pair of vertical portions 22 and 23 may be integrally formed by casting or injection molding to form the carrier 11 as a unitary one-piece structure. Accordingly, the weight and manufacturing cost of the carrier 11 may be reduced and the assembly thereof may be simplified.

Referring to FIGS. 2 to 4, the active air flap 12 may be disposed below the carrier 11, and the active air flap 12 may include a flap frame 13 having an opening 13a, and a plurality of flaps 12a that open and close the opening 13a of the flap frame 13. The flap frame 13 may be disposed on a bottom end of the carrier 11. According to an exemplary embodiment, the flap frame 13 may be detachably coupled to the bottom end of the carrier 11. According to another exemplary embodiment, the flap frame 13 may be integrally formed with the bottom end of the carrier 11. The plurality of flaps 12a may be mounted inside the flap frame 13 to be pivotable by an actuator (not shown) to allow the plurality of flaps 12a to open and close the opening 13a of the flap frame 13.

As illustrated in FIG. 4, the active air flap 12 may be disposed adjacent to the lower grille 2 of the bumper cover 1, to allow the opening 13a of the flap frame 13 to communicate with the lower grille 2. As the plurality of flaps 12a selectively open the opening 13a of the flap frame 13, the outside air may be guided toward the heat exchanger 8. Since the active air flap 12 may be disposed on the bottom end of the carrier 11, a lower member of a conventional carrier may be eliminated. Thus, the manufacturing cost and weight of the carrier may be reduced. The heat exchanger 8 may include one or more heat exchange units, and the heat exchange units may each include a cooling module, a radiator, a condenser, and the like for cooling a battery, electric parts, and the like of the electric vehicle. The heat exchanger 8 may be disposed within the receiving opening 24 of the carrier 11.

As illustrated in FIGS. 3 and 4, the front end module 10 for an electric vehicle, according to the exemplary embodiment of the present disclosure, may include an air guard 25 disposed above the active air flap 12. The air guard 25 may cover the front of the heat exchanger 8 disposed within the opening 24 of the carrier 11. As illustrated in FIG. 3, the air guard 25 may be coupled to the heat exchanger 8 by fasteners to cover the front of the heat exchanger 8. As illustrated in FIG. 4, the air guard 25 may have a cavity 25*a* that faces the front surface of the heat exchanger 8 to form a passage through which the air passes between the inner surface of the air guard 25 and the front surface of the heat exchanger 8.

Referring to FIG. 4, the air guard 25 may have an open end 25*b* formed at a bottom end thereof, and the open end 25*b* of the air guard 25 may be disposed to face the active air flap 12. As the flaps 12*a* of the active air flap 12 are opened, the outside air may be introduced into the cavity 25*a* of the air guard 25 through the open end 25*b* of the air guard 25. Thus, the air guard 25 may prevent the outside air from leaking to the outside of the heat exchanger 8 and the outside air may be more uniformly distributed to the front surface of the heat exchanger 8 through the cavity 25*a* of the air guard 25. Therefore, the flow rate of the outside air that passes through the heat exchanger 8 may be increased, and thus the heat exchange performance of the heat exchanger 8 may be improved. The air guard 25 may be disposed in front of the front surface of the heat exchanger 8 to manage air flow, whereby the flow rate of the outside air that passes through the heat exchanger 8 may be increased and the heat exchange performance of the heat exchanger 8 may be improved.

Figure 5:
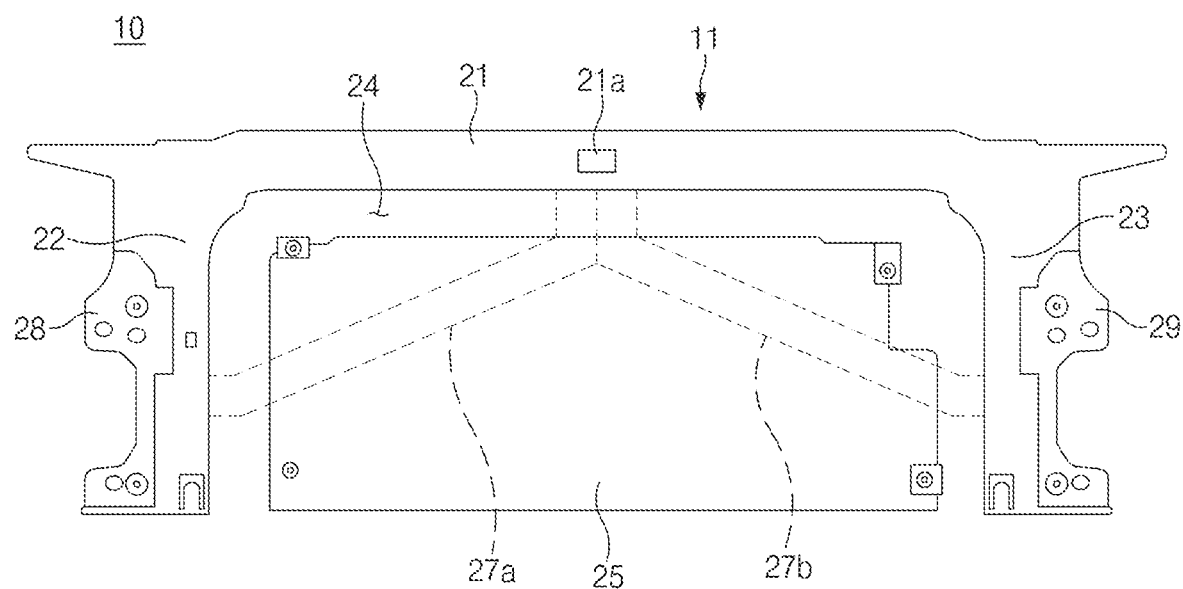
FIG. 5 illustrates a front view of a carrier and an air guard of a front end module for an electric vehicle, according to an exemplary embodiment of the present disclosure.

As illustrated in FIG. 5, since the air guard 25 is disposed in the receiving opening 24 of the carrier 11, a top surface of the air guard 25 may be spaced apart from the cross portion 21 of the carrier 11, and left and right side surfaces of the air guard 25 may be spaced apart from the vertical portions 22 and 23, respectively. Since the air guard 25 is an independent component with respect to the carrier 11, the air guard 25 may be separately assembled after the assembly of the carrier 11.

The carrier 11 may further include a pair of reinforcing members 27*a* and 27*b* that extend from the vertical portions 22 and 23 to the center of the cross portion 21, respectively. Each of the reinforcing members 27*a* and 27*b* may include a plate or a rod. A bottom end of the left reinforcing member 27*a* may be coupled to the left vertical portion 22, and a top end of the left reinforcing member 27*a* may be coupled to the center of the cross portion 21 to connect the left reinforcing member 27*a* between the left vertical portion 22 and the center of the cross portion 21. A bottom end of the right reinforcing member 27*b* may be coupled to the right vertical portion 23, and a top end of the right reinforcing member 27*b* may be coupled to the center of the cross portion 21 to connect the right reinforcing member 27*b* between the right vertical portion 23 and the center of the cross portion 21. The left reinforcing member 27*a* and the right reinforcing member 27*b* may be symmetrical to each other with respect to the center of the cross portion 21.

According to an exemplary embodiment, a hood latch retention 21*a* may be disposed at the center of the cross portion 21, and the top end of the left reinforcing member 27*a* and the top end of the right reinforcing member 27*b* may be coupled to the hood latch retention 21*a* to improve stiffness to support the hood latch retention 21*a*. In the exemplary embodiment illustrated in FIG. 5, the carrier 11 may be made of engineering plastics such as PA6-GF30, and the air guard 25 may be made of commodity plastics such as polypropylene (PP).

Figure 6:
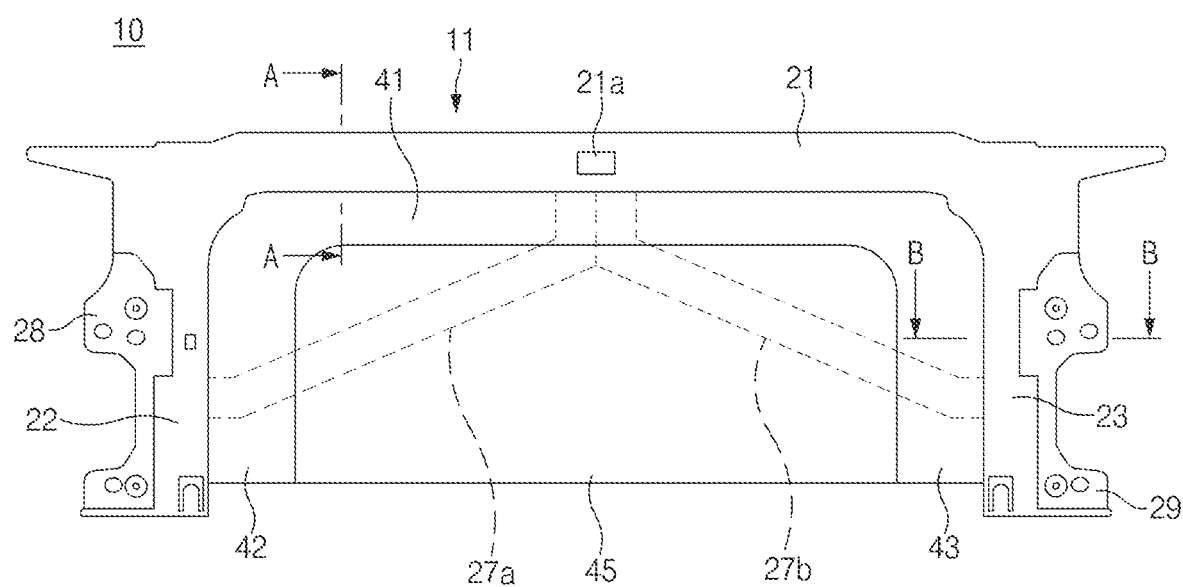
FIG. 6 illustrates a front view of a carrier and an air guard of a front end module for an electric vehicle, according to another exemplary embodiment of the present disclosure.
Figure 7:
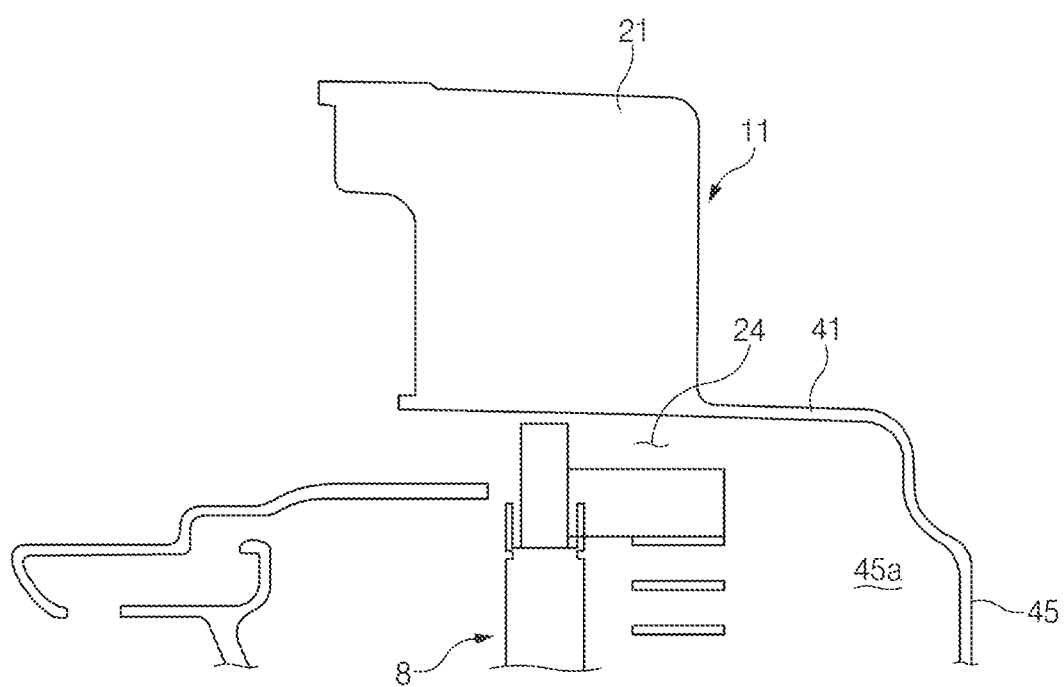
FIG. 7 illustrates a cross-sectional view of the carrier and the air guard illustrated in FIG. 6, taken along line A-A, according to an exemplary embodiment of the present disclosure.
Figure 8:
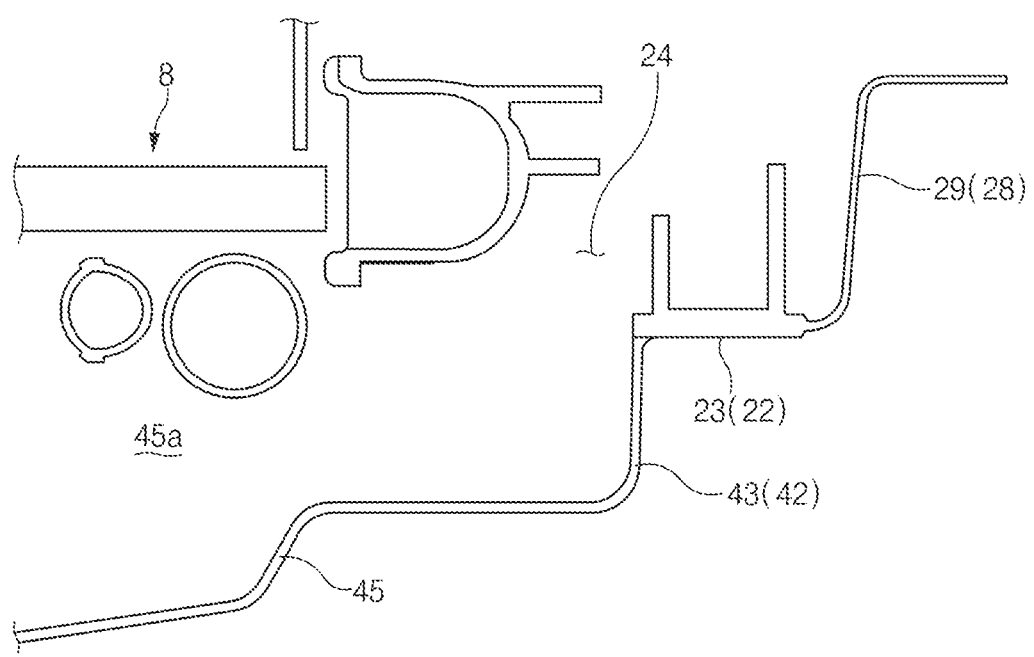
FIG. 8 illustrates a cross-sectional view of the carrier and the air guard illustrated in FIG. 6, taken along line B-B, according to an exemplary embodiment of the present disclosure.

FIGS. 6 to 8 illustrate a front end module for an electric vehicle, according to another exemplary embodiment of the present disclosure, which may include the carrier 11, and an air guard 45 connected to the carrier 11 to form a unitary one-piece structure. As illustrated in FIGS. 7 and 8, the air guard 45 may have a cavity 45*a* that faces the front surface of the heat exchanger 8 to form a passage through which the air passes between the air guard 45 and the front surface of the heat exchanger 8.

Referring to FIGS. 6 and 7, a top edge of the air guard 45 may be integrally formed with the cross portion 21 through an upper connecting wall 41. Referring to FIGS. 6 and 8, both lateral edges of the air guard 45 may be integrally formed with the pair of vertical portions 22 and 23 through a pair of lateral connecting walls 42 and 43. The upper connecting wall 41 and the pair of lateral connecting walls 42 and 43 may be connected to each other to allow the receiving opening 24 of the carrier 11 to be closed by the upper connecting wall 41 and the pair of lateral connecting walls 42 and 43.

As illustrated in FIGS. 7 and 8, the heat exchanger 8 may be disposed in the receiving opening 24 of the carrier 11 to allow a top edge of the heat exchanger 8 to be adjacent to or abut a bottom surface of the cross portion 21 of the carrier 11 as illustrated in FIG. 7. Both lateral edges of the heat exchanger 8 may be adjacent to the vertical portions 22 and 23 of the carrier 11 as illustrated in FIG. 8. The air guard 45 may be integrally formed with the carrier 11 through the upper connecting wall 41 and the lateral connecting walls 42 and 43 by casting or injection molding to form the carrier 11 and the air guard 45 as a unitary one-piece structure. Thus, the carrier 11 and the air guard 45 may be modularized into the unitary one-piece structure to reduce weight and increase stiffness and strength thereof. Moreover, the carrier 11 and the air guard 45 may be assembled together to the front part of the vehicle body to simplify the assembly process.

Figure 9:
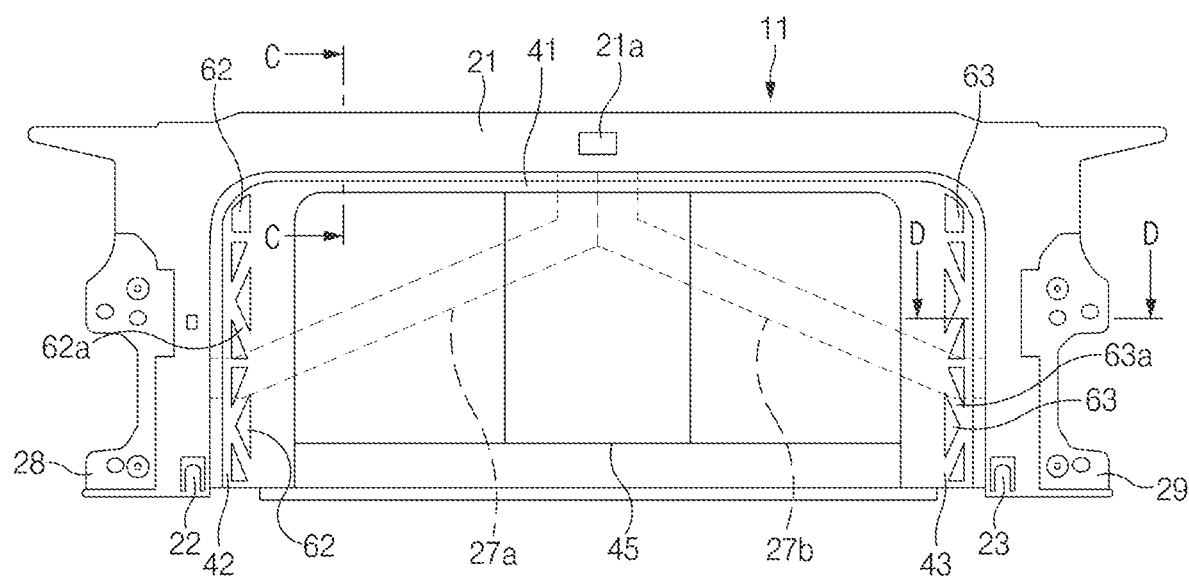
FIG. 9 illustrates a front view of a carrier and an air guard of a front end module for an electric vehicle, according to another exemplary embodiment of the present disclosure.
Figure 10:
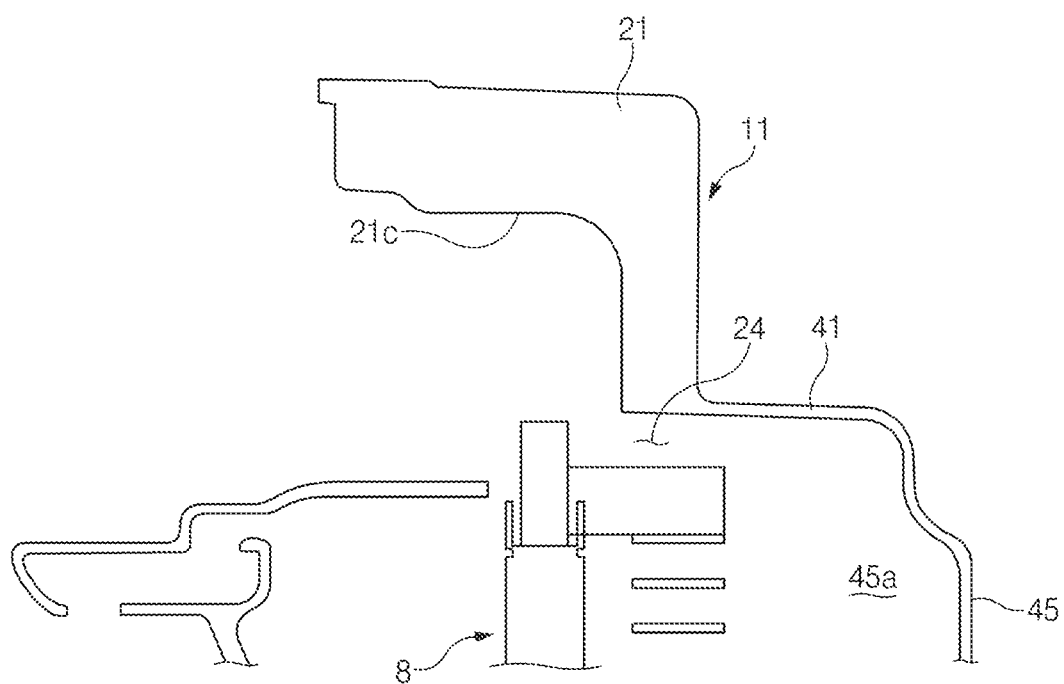
FIG. 10 illustrates a cross-sectional view of the carrier and the air guard illustrated in FIG. 9, taken along line C-C, according to another exemplary embodiment of the present disclosure.
Figure 11:
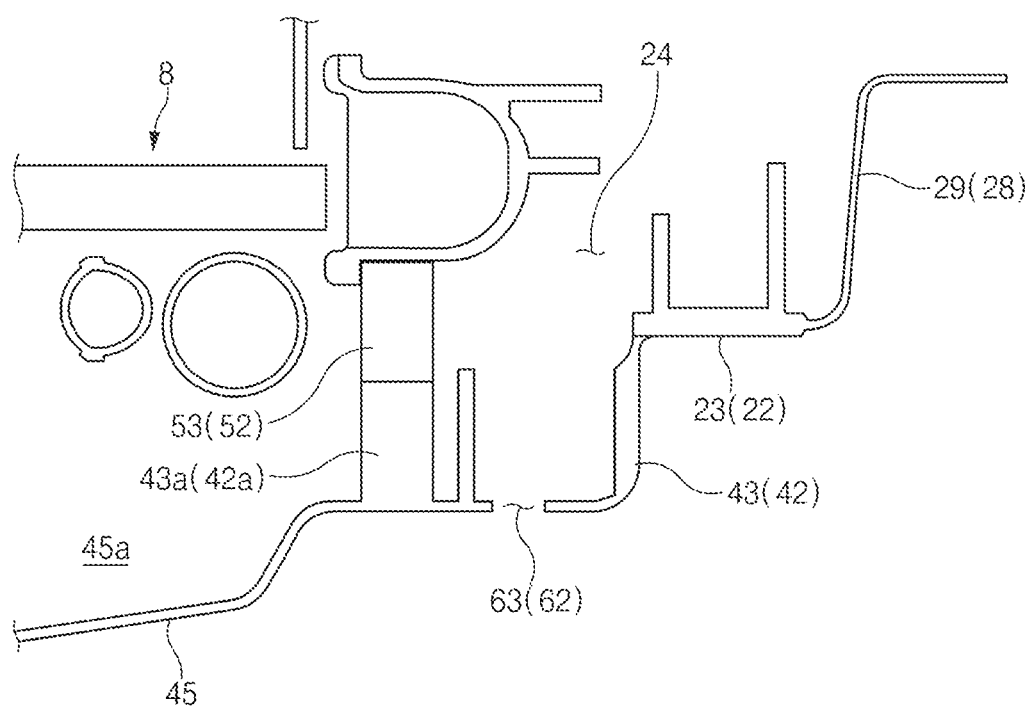
FIG. 11 illustrates a cross-sectional view of the carrier and the air guard illustrated in FIG. 9, taken along line D-D, according to another exemplary embodiment of the present disclosure.

FIGS. 9 to 11 illustrate a front end module for an electric vehicle, according to another exemplary embodiment of the present disclosure. As illustrated in FIGS. 9 and 10, the cross portion 21 of the carrier 11 may have a receiving groove 21*c* formed in a back surface thereof. Since the edge of the heat exchanger is disposed in the receiving groove 21*c*, a relatively large heat exchanger may be mounted in accordance with the receiving groove 21*c* of the cross portion 21, and thus a cooling area of the heat exchanger may be increased. As the cross portion 21 and the pair of vertical portions 22 and 23 of the carrier 11 are formed as the unitary one-piece structure, the stiffness and strength of the carrier 11 may be increased, and even with the receiving groove 21*c* formed in the cross portion 21, the stiffness and strength of the cross portion 21 may be maintained.

As illustrated in FIGS. 9 and 11, the lateral connecting walls 42 and 43 may have seal ribs 42*a* and 43*a* that extend vertically, and seals 52 and 53 may be interposed between the seal ribs 42*a* and 43*a* and both lateral edges of the heat exchanger 8, respectively. The seal ribs 42*a* and 43*a* and the seals 52 and 53 may prevent the leakage of the outside air between the air guard 45 and the heat exchanger 8, and thus the flow rate of the outside air that passes through the heat exchanger 8 may be secured.

In addition, as illustrated in FIGS. 9 and 11, the lateral connecting walls 42 and 43 may have a plurality of cavities or cored portions (e.g., apertures or lightening holes) 62 and 63, respectively, which may reduce weight and material cost. The plurality of cavities or cored portions 62 and 63 may be formed in a line to prevent interference with the seal ribs 42a and 43a. In particular, the plurality of cavities or cored portions 62 and 63 may be disposed between the seal ribs 42a and 43a and the corresponding vertical portions 22 and 23 (e.g., regions where the leakage of the outside air does not occur), and thus they may not hinder the sealing of air by the seal ribs 42a and 43a and the seals 52 and 53. A plurality of ribs 62a and 63a may be formed by the plurality of cavities or cored portions 62 and 63, and the plurality of ribs 62a and 63a may be formed to have a zigzag structure.

Rest of the configuration of the front end module according to this exemplary embodiment may be similar to that according to the preceding exemplary embodiment, and thus, details thereof will be omitted.

According to the exemplary embodiments illustrated in FIGS. 6 to 11, the carrier 11 and the air guard 45 may be connected to form a unitary one-piece structure by casting or injection molding to allow the carrier 11 and the air guard 45 to be made of a same plastic. For example, the carrier 11 and the air guard 45 may be made of long fiber reinforced thermoplastics such as PP-LGF40. In the exemplary embodiments illustrated in FIGS. 6 to 11, the carrier 11 and the air guard 45 may be formed as the unitary one-piece structure using a relatively inexpensive plastic, which is less expensive than engineering plastics, and thus the manufacturing cost and weight may be reduced.

In addition, according to the exemplary embodiments illustrated in FIGS. 6 to 11, the carrier 11 and the air guard 45 may be connected to form the unitary one-piece structure by casting or injection molding to increase the stiffness and strength of the carrier 11 and the air guard 45, and accordingly, the thicknesses of the side panels 28 and 29 may be reduced. For example, the thickness of each of the side panels 28 and 29 in the exemplary embodiments illustrated in FIGS. 2 to 5 may be about 1 mm, and the thickness of each of the side panels 28 and 29 in the exemplary embodiments illustrated in FIGS. 6 to 11 may be about 0.7 mm.

As set forth above, according to exemplary embodiments of the present disclosure, since the active air flap is disposed below the carrier, such a structure may be suitable for a bumper cover of an electric vehicle, and thus the manufacturing cost and weight thereof may be reduced. In addition, since the active air flap is disposed below the carrier, a lower member of a conventional carrier may be eliminated, and thus the manufacturing cost and weight may be further reduced. The cross portion and the pair of vertical portions may be integrally formed by casting or injection molding to form the carrier as a unitary one-piece structure, and thus the weight and manufacturing cost of the carrier may be reduced, and the assembly thereof may be facilitated.

Furthermore, the air guard may be disposed in front of the front surface of the heat exchanger to manage air flow, whereby the flow rate of the outside air that passes through the heat exchanger may be increased, and the heat exchange performance of the heat exchanger may be improved. Moreover, the air guard may be integrally formed with the carrier through the upper connecting wall and the lateral connecting walls by casting or injection molding to form the carrier and the air guard as a unitary one-piece structure. Thus, the carrier and the air guard may be modularized into the unitary one-piece structure to achieve a reduction in weight and increase in stiffness and strength, and the carrier and the air guard may be assembled together to the front part of the vehicle body to simplify the assembly process.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A front end module for an electric vehicle, comprising:
a carrier disposed inside a bumper cover having a lower grille, wherein the carrier includes a receiving opening;
a heat exchanger disposed within the receiving opening;
an active air flap disposed below the carrier and adjacent to the lower grille, wherein the active air flap includes a plurality of pivotable flaps; and
an air guard disposed above the active air flap and covering a front surface of the heat exchanger disposed within the receiving opening of the carrier,
wherein the air guard has a cavity that faces the front surface of the heat exchanger, and
wherein the air guard has an open end that faces the active air flap, and outside air is introduced into the cavity of the guard by opening the plurality of flaps.

2. The front end module according to claim 1, wherein the carrier includes a cross portion and a pair of vertical portions that extend vertically from both ends of the cross portion, and the receiving opening is defined by the cross portion and the pair of vertical portions.

3. The front end module according to claim 2, wherein the cross portion has a receiving groove within which a top edge of the heat exchanger is disposed.

4. The front end module according to claim 2, further comprising:
a pair of side panels coupled to the plurality of vertical portions, respectively,
wherein the carrier is made of a plastic material, and
wherein the side panels are made of a metallic material.

5. The front end module according to claim 2, wherein the carrier further includes:
a pair of reinforcing members that extend from the vertical portions to a center of the cross portion, respectively,
wherein the pair of reinforcing members are symmetrical to each other with respect to the center of the cross portion.

6. The front end module according to claim 5, wherein a hood latch retention is disposed at the center of the cross portion, and a top end of each of the reinforcing members is coupled to the hood latch retention.

7. The front end module according to claim 1, wherein the air guard is connected to the carrier to form a unitary one-piece structure.

8. The front end module according to claim 7, wherein a top edge of the air guard is integrally connected with the cross portion through an upper connecting wall.

9. The front end module according to claim 7, wherein both lateral edges of the air guard are integrally connected with the pair of vertical portions through a pair of lateral connecting walls.

10. The front end module according to claim 9, wherein the lateral connecting walls have seal ribs that extend vertically, and seals are interposed between the seal ribs and both lateral edges of the heat exchanger.

11. The front end module according to claim 9, wherein each of the lateral connecting walls has a plurality of apertures.

\* \* \* \* \*